US005850076A

United States Patent [19]

Morioka et al.

[11] Patent Number: 5,850,076

[45] Date of Patent: Dec. 15, 1998

[54] AUTOMATED TRANSACTION APPARATUS

[75] Inventors: Makoto Morioka; Tomotaka Suzuki; Takuji Shiota, all of Kawasaki, Japan

[73] Assignee: Fujitsu Limited, Kawasaki, Japan

[21] Appl. No.: 843,438

[22] Filed: Apr. 16, 1997

Related U.S. Application Data

[63] Continuation of Ser. No. 432,263, May 1, 1995, Pat. No. 5,650,605.

[30] Foreign Application Priority Data

May 25, 1994 [JP] Japan .................................... 6-110925

[51] Int. Cl.[6] ...................................................... G06F 17/60

[52] U.S. Cl. ................................................ 235/379; 902/8

[58] Field of Search .................................... 235/379, 380, 235/381; 902/8

[56] References Cited

U.S. PATENT DOCUMENTS 5,183,142 2/1993 Latchinian et al. ..................... 235/381
5,243,174 9/1993 Veeneman et al. ..................... 235/381

*Primary Examiner*—Harold Pitts
*Attorney, Agent, or Firm*—Staas & Halsey

[57] ABSTRACT

A display device displays information. An input device inputs information about a transaction. An operation unit includes a selection requesting unit and a selection processor. The selection requesting unit requests a user to input information in an alternative style via the display device. The selection processor performs a predetermined process based on information, selectively input by the user through the display device and a selection input unit of the input device, and the internal state. A transaction processor performs a transactional process based on the transactional operation of the operation unit. The transaction processor communicates with a host system in a center to accomplish a transaction.

3 Claims, 15 Drawing Sheets

AUTOMATED TRANSACTION APPARATUS

This application is a continuation of application Ser. No. 08/432,263, filed May 1, 1995, now U.S. Pat. No. 5,650,605.

BACKGROUND OF THE INVENTION

1. Field of the Invention

The present invention relates to an automated transaction apparatus called an ATM (Automatic Teller Machine), a CD (Cash Dispenser), an automatic remitter or a bond issuing machine, and more particularly, to an improvement on the operability of transactions in an automated transaction apparatus.

2. Description of the Related Art

Recently, an automated transaction apparatus like an ATM for financial institutions, such as banks, which can ensure transactions without requiring a bank employee like a teller, has been developed and used. This automated transaction apparatus allows a customer or a user to perform an operation, such as the inputting of information, in an interactive manner while viewing what is shown on the display screen of the apparatus, thereby accomplishing the desired transaction.

As one way to interact with a user, the conventional automated transaction apparatus displays, for example, guidance messages on the screen of its display device one after another to request the user to input or select information, or request the user of another operation. In accordance with the guidance or the like on the display screen, the user performs an operation, like inputting information, to make an transaction. The execution of an transaction requires various operations, such as inputting information.

According to the conventional automated transaction apparatus, a user should properly manipulate multiple keys, such as a cancel key, correction key, confirmation key and numeric keys, arranged close to the display device, in accordance with guidance messages displayed on the display device to input desired information in accomplishing an transaction. There is another automated transaction apparatus which has a transparent flat switch called a touchpanel placed over the display surface of the display device, and has keys or the like displayed on the screen of the display device, so that touching a key on the screen inputs the associated information. According to this conventional automated transaction apparatus, multiple keys, such as a cancel key, correction key, confirmation key and numeric keys, are displayed on the screen of the display device, and a user should properly manipulate the keys to input desired information, thereby accomplishing an transaction. To properly guide the user in the manipulation, guidance messages are displayed as needed.

To users who are not familiar with the operation of the apparatus, particularly, the existence of multiple keys like the cancel key, correction key, confirmation key and numeric keys not only gives an impression of troublesome operations but also often makes it difficult to decide which key to select at which point of time. It is often the case that displaying a guidance message alone is not good enough for such users to grasp the right course of action.

Further, users who suffer injuries or physically handicapped users, particularly, those who suffer injured upper limbs or unsmooth movement thereof, may have a difficulty in manipulating the intended section. When the keybuttons are small and the distances between the keybuttons are short as in the case of the numeric keys like 10-keys or character keys, particularly, it is very difficult for users to select and operate the intended keys, resulting in erroneous key inputs or making the user feel tiresome in making key inputs.

Due to the increased amount of transactions and the increased number of users who use automated transaction apparatuses, there is a demand for easier and more understandable operations to make transactions. More specifically, it is desirable that even users who are not familiar with the operation of the automated transaction apparatus or handicapped users can easily operate the apparatus.

According to the conventional automated transaction apparatuses, as described above however, there are multiple keys like the cancel key, correction key, confirmation key and numeric keys, which should be properly operated in accordance with predetermined procedures. This kind of manipulation cannot be said to be easy for every people even guidance messages are displayed. It is true that the very provision of such multiple keys can reduce the substantial number of operations and can thus ensure quick operations. It is also true that this design results in multifarious forms of operations and makes the manipulation of the apparatus difficult and complex.

SUMMARY OF THE INVENTION

Accordingly, it is an object of the present invention to provide an automated transaction apparatus which can facilitate transaction operations for the improved operability, and can systematically improve services for many users.

It is another object of this invention to provide an automated transaction apparatus which ensures the same type of operations for different transactions so that even users who are not familiar with the operation of the apparatus can easily operate the apparatus with less awkwardness.

It is a further object of this invention to provide an automated transaction apparatus which simplifies the transaction operations so that even users having a difficulty in freely operating the apparatus can easily manipulate it.

An automated transaction apparatus according to this invention comprises a display device for displaying information, an input device for inputting information associated with a transaction, an operation unit for controlling information display by the display device and executing a transactional operation based on the information input from the input device in association with the information display, and a transaction processor for performing a transactional process based on the operation of the operation unit. The operation unit is designed to facilitate and simplify the transactional operation by improved display contents and display forms, thereby improving the operability.

The automated transaction apparatus embodying this invention comprises the display device, input device, operation unit and transaction processor.

The display device displays information. The input device inputs information about a transaction. The input device has a selection input unit for effecting, for example, alternative inputting of information. The input device may further include a transparent switch placed over the display surface of the display device. The switch in combination with display contents can function as various switches.

The operation unit includes a selection requesting unit, a selection processor, an information input processor and an operation selector, for example. The selection requesting unit requests a user to input information in an alternative style via the display device. The selection requesting unit may request the user to make every information input in an alternative style via the display device. The selection processor performs a predetermined process based on information, selectively input by the user through the display device and the selection input unit of the input device, and an internal state. The information input processor performs an information input process in a style other than the alternative input style through the display device and the input device. The operation selector permits the user to select whether to use an alternative input style or an information input style other than the alternative input style via the display device and the input device.

The transaction processor performs a transactional process based on the transactional operation of the operation unit. The transaction processor communicates with, for example a host system in a center to accomplish a transaction.

An automated transaction apparatus according to a first aspect of this invention comprises a display device, an input device, an operation unit, which has a selection requesting unit and a selection processor, and a transaction processor. The selection requesting unit requests a user to input information in an alternative style via the display device. The selection processor performs a predetermined process based on information, selectively input by the user through the input device, and an internal state.

An automated transaction apparatus according to a second aspect of this invention comprises a display device, an input device, an operation unit, which has a selection requesting unit and a selection processor, and a transaction processor. The selection requesting unit requests a user to make every information input in an alternative style via the display device. The selection processor performs a predetermined process based on information, selectively input by the user through the input device, and an internal state.

An automated transaction apparatus according to a third aspect of this invention comprises a display device, an input device, which has a selection input unit, an operation unit, which has a selection requesting unit and a selection processor, and a transaction processor. The selection requesting unit requests a user to input information in an alternative style via the display device. The selection input unit performs an alternative information input by selecting one of two kinds of operation styles. The selection processor performs a predetermined process based on information, selectively input by the user through the selection input unit, and an internal state.

An automated transaction apparatus according to a fourth aspect of this invention comprises a display device, an input device, an operation unit, which has a selection requesting unit, a selection processor, an information input processor and an operation selector, and a transaction processor. The selection requesting unit requests a user to input information in an alternative style via the display device. The selection processor performs a predetermined process based on information, selectively input by the user through the input device, and an internal state. The information input processor performs an information input process other than an alternative input style through the display device and the input device. The operation selector permits the user to select whether to use an alternative input style or an information input style other than the alternative input style.

An automated transaction apparatus according to a fifth aspect of this invention comprises a display device, an input device, which has a switch, an operation unit, which has a selection requesting unit and a selection processor, and a transaction processor. The switch is formed transparent and is placed over the display surface of the display device for, when touched, inputting information corresponding to the display of the display device associated with a touched position. The selection requesting unit requests a user to input information in an alternative style via the display device. The selection processor performs a predetermined process based on information, selectively input by the user through the switch, and an internal state.

According to the above-described automated transaction apparatuses of this invention, the operation unit controls the information display of the display device and performs an operation to input information for a transaction based on the information input from the input device, and the transaction processor performs a transactional process.

In the automated transaction apparatus according to the first aspect of this invention, the selection requesting unit requests a user to input information in an alternative style via the display device and the selection processor performs a predetermined process based on information, selectively input by the user through the display device and the input device, and an internal state, whereby the user should simply perform the alternative operation. That is, the actual operation the user has to perform is very simple. Therefore, even a user who is not familiar with the operation or who has a difficulty in performing the operation can easily and surely operate the apparatus.

In the automated transaction apparatus according to the second aspect of this invention, the operation unit causes the selection requesting unit to request a user to make every information input in an alternative style via the display device, so that the user should simply operate the input device in an alternative style to input every information. This can allow even a user who has a difficulty in performing the operation to easily and surely operate the apparatus.

The automated transaction apparatus according to the third aspect of this invention has the selection input unit which performs an alternative information input by selecting one of two kinds of operation styles. This makes clearer the alternative operation the user should perform, thus ensuring easier and surer operations.

The automated transaction apparatus according to the fourth aspect of this invention further has the information input processor, which uses an input style like the multiple selection style as employed in the prior art, and the operation selector for selecting one of the alternative input style and the information input style other than the alternative input style. This design allows a user to select the input operation style as needed, thus ensuring an operation by the proper input operation style desired by the user or convenient for the user.

The automated transaction apparatus according to the fifth aspect of this invention has the transparent switch placed over the display surface of the display device, so that when a user touches the display screen, information corresponding to the display content of the display device associated with the touched position is input. This can allow the user to easily grasp the relationship between the input request by the alternative input style and the input operation, whereby the user can perform the interactive operation more easily.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

Automated transaction apparatuses according to preferred embodiments of the present invention will now be described referring to the accompanying drawings.

First Embodiment

Figure 1:
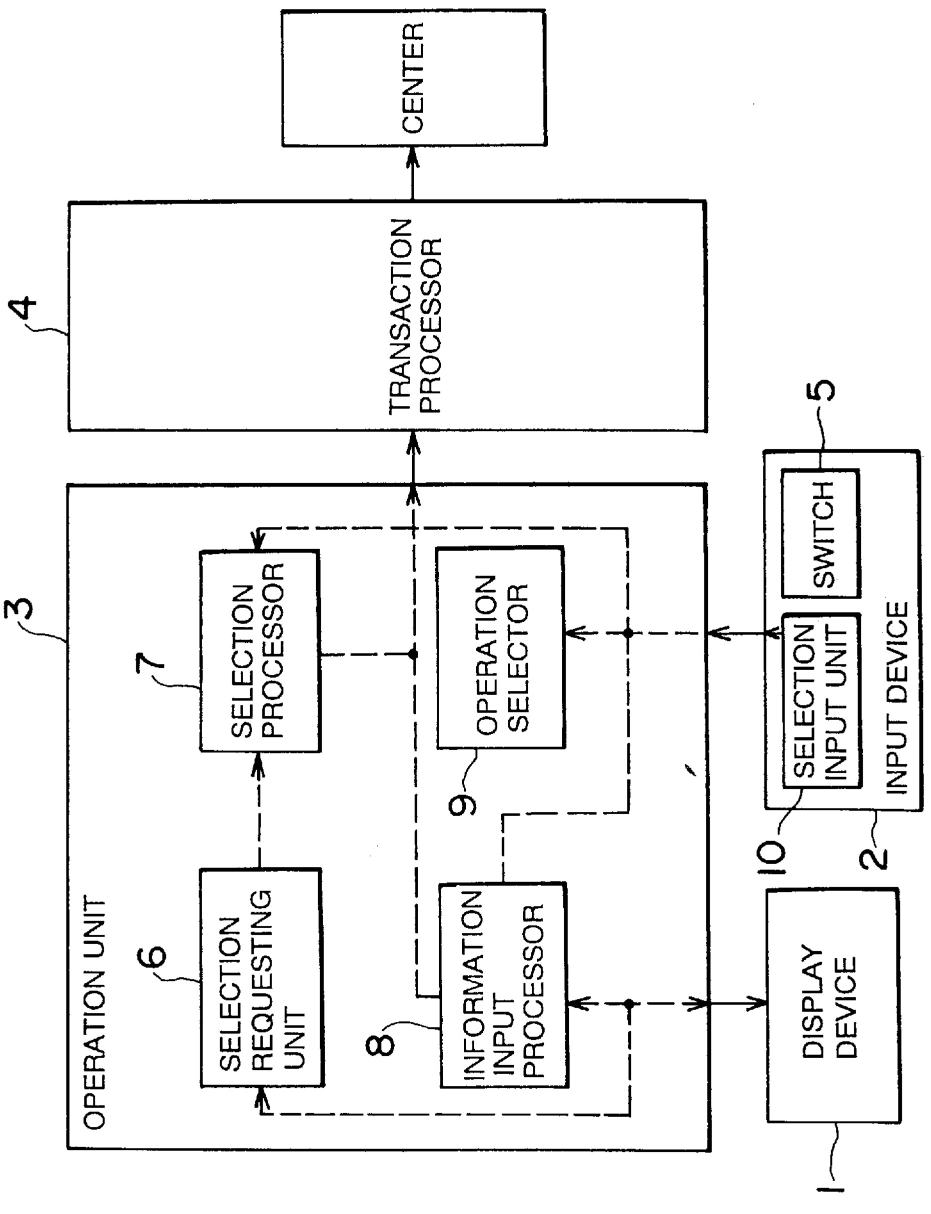
FIG. 1 is a block diagram showing the principle structure of an automated transaction apparatus according to a first embodiment of the present invention.

FIG. 1 shows the principle structure of an automated transaction apparatus according to a first embodiment of this invention.

The automated transaction apparatus shown in FIG. 1 has a display device 1, an input device 2, an operation unit 3 and a transaction processor 4.

The display device 1 displays information.

The input device 2 inputs information associated with a transaction. The input device 2 has a selection input unit 5 for effecting an alternative information input, for example. This input device 2 may further include a transparent switch 10 which is arranged over the display surface of the display device 1. This switch 10 in combination with display contents can function as various switches.

The operation unit 3 includes a selection requesting unit 6, a selection processor 7, an information input processor 8 and an operation selector 9, for example.

The selection requesting unit 6 requests a user to input information in an alternative style via the display device 1. The selection requesting unit 6 may request the user to make every information input in an alternative style via the display device.

The selection processor 7 performs a predetermined process based on information, selectively input by the user through the display device 1 and the selection input unit 5 of the input device 2, and an internal state.

The information input processor 8 performs an information input process in a style other than the alternative input style through the display device and the input device.

The operation selector 9 permits the user to select whether to use the alternative input style or the information input style other than the alternative input style via the display device 1 and the input device 2.

The transaction processor 4 performs a transactional process based on the transactional operation of the operation unit 3. This transaction processor 4 communicates with, for example the host system in a center to accomplish a transaction.

According to the above-described automated transaction apparatus, the operation unit 3 controls the information display of the display device 1 and performs an operation to input information for a transaction based on the information input from the input device 2, and the transaction processor 4 performs a transactional process.

Accordingly, the selection requesting unit 6 requests a user to input information in an alternative style via the display device 1 and the selection processor 6 performs a predetermined process based on information, selectively input by the user through the display device 1 and the input device 2, and the internal state. Therefore, the user should simply perform the alternative operation. That is, the actual operation the user has to perform is very simple. Therefore, even if the user is not familiar with the operation or has a difficulty in performing the operation, the user can easily and surely operate the apparatus.

The operation unit 3 causes the selection requesting unit 6 to request a user to make every information input in an alternative style, so that the user should simply operate the input device 2 in the alternative style to input every information. This can allow even a user who has a difficulty in performing the operation to easily and surely operate the apparatus.

The input device 2 has the selection input unit 5 for performing an alternative information input by selecting one of two kinds of operation styles. Therefore, the alternative operation the user should perform becomes clearer, thus ensuring easier and surer operations.

Further, the information input processor 8, which uses an input style like the multiple selection style as employed in the prior art, is provided, and the operation selector 9, which serves to select one of the alternative input style and the information input style other than the alternative input style, is additionally provided. This design allows a user to select the input operation style as needed, thus ensuring an operation by the proper input operation style desired by the user or convenient for the user.

The transparent switch 10 is provided over the display surface of the display device 1, so that by touching the display screen, any user can input information corresponding to the display content of the display device associated with the touched position. This can allow the user to easily grasp the relationship between the input request by the alternative input style and the input operation, whereby the user can perform the interactive operation more easily.

Second Embodiment

FIGS. 2 through 20 illustrate the structure of an ATM which is an automated transaction apparatus according a second embodiment of this invention. Like or same reference numerals as used in FIG. 1 will be used to denote substantially identical portions.

Figure 2:
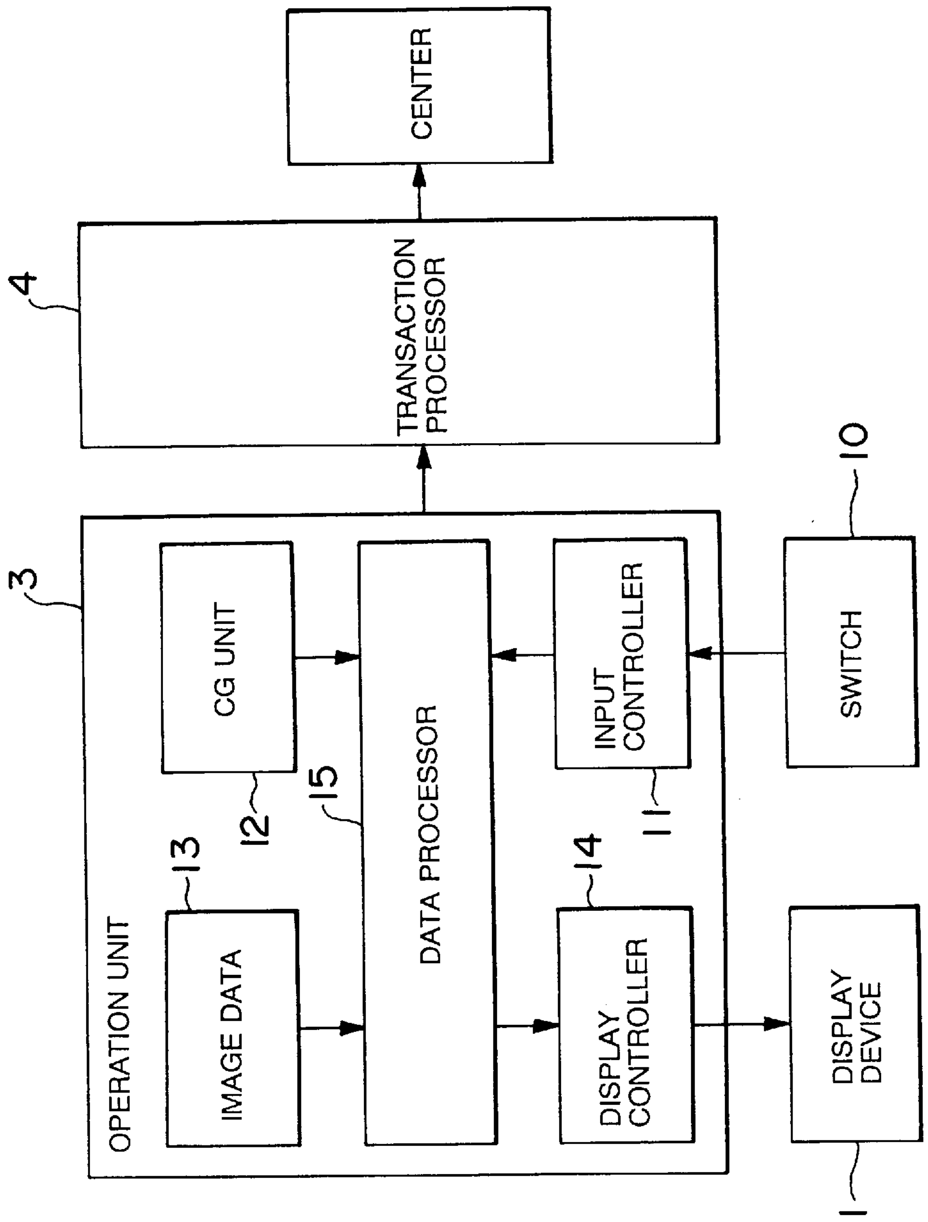
FIG. 2 is a block diagram showing the structures of the essential portions of an ATM according to a second embodiment of this invention.

The ATM in FIG. 2 has a display device 1, an operation unit 3, a transaction processor 4 and a switch 10.

The display device 1 displays information such as a guidance message using a CRT display or a liquid crystal display (LCD) panel, for example. The switch 10 as an input device is a transparent flat switch (so-called a touch switch or touch sensor) placed over the display surface of the display device 1. When the flat switch 10 is touched, the touched position is detected and the information, which is associated with the display content of the display device 1 at the touched position, is input.

The operation unit 3 includes an input controller 11, a CG (Character Generator) unit 12, an image data holding unit 13, a display controller 14 and a data processor 15.

The input controller 11 controls the switch 10 to receive input information. The input controller 11 therefore has a position processing function to detect a touched position. The CG unit 6 has a character generator constituted of, for example, a ROM (Read Only Memory) storing character patterns necessary for the information display, and generates character data forming display information such as a message displayed on the display device 1. Multiple pieces of image data for forming display screens to be displayed on the display device 1 are stored previously in the image data holding unit 13. Desired image data is read from the image data holding unit 13 and is displayed, as needed. This image data is displayed in combination with a character pattern generated by the CG unit 12 as needed. Further, only the necessary portion of the real apparatus, picked up by a pickup device like a video camera, may be extracted from the picked-up image and may be stored previously in the image data holding unit 13, whereby this image information is read as image data from the image data holding unit 13 and is displayed, as needed. This way, the guidance becomes more specific, allowing a user (operator) to grasp the guidance more clearly. The display controller 14 controls the display device 1 to display desired information on the display screen.

The data processor 15 causes the display device 1 to display a message to a user and operation buttons or the like through the display controller 14, using the character data and image data obtained from the CG unit 12 and the image data holding unit 13. The data processor 15 obtains input information via the input controller 11 upon the user's operation of the switch 10, and changes, as needed, the message to the user and the operation buttons or the like to be displayed on the display device 1 in accordance with this input information and in order to execute a predetermined transaction. At the same time, the data processor 15 generates transactional control information according to the user's input operation.

The transaction processor 4 communicates with the host system in the center and performs a predetermined transactional process based on the transactional control information, generated in the data processor 15 of the operation unit 3 by the input operation by the user.

The input controller 11, CG unit 12, image data holding unit 13, display controller 14 and data processor 15 of the operation unit 3 cooperate to execute functions equivalent to those of the above-described selection requesting unit 6, selection processor 7, information input processor 8 and operation selector 9.

Figure 3:
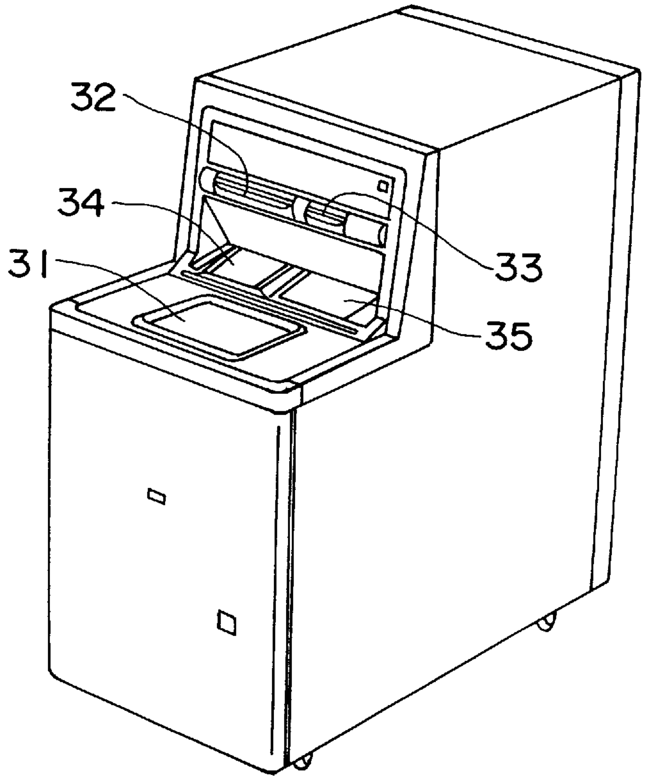
FIG. 3 is a perspective view showing the general structure of the ATM in FIG. 2.

FIG. 3 shows the outline of the ATM which incorporate the above-described structure.

FIG. 3 shows the outline of the ATM, a display input section 31, a passbook slot 32 for the insertion and removal of a passbook, a card slot 33 for the insertion and removal of a card and a slip, a coin slot 34 for the insertion and removal of coins, and a bill slot 35 for the insertion and removal of bills.

Figure 4:
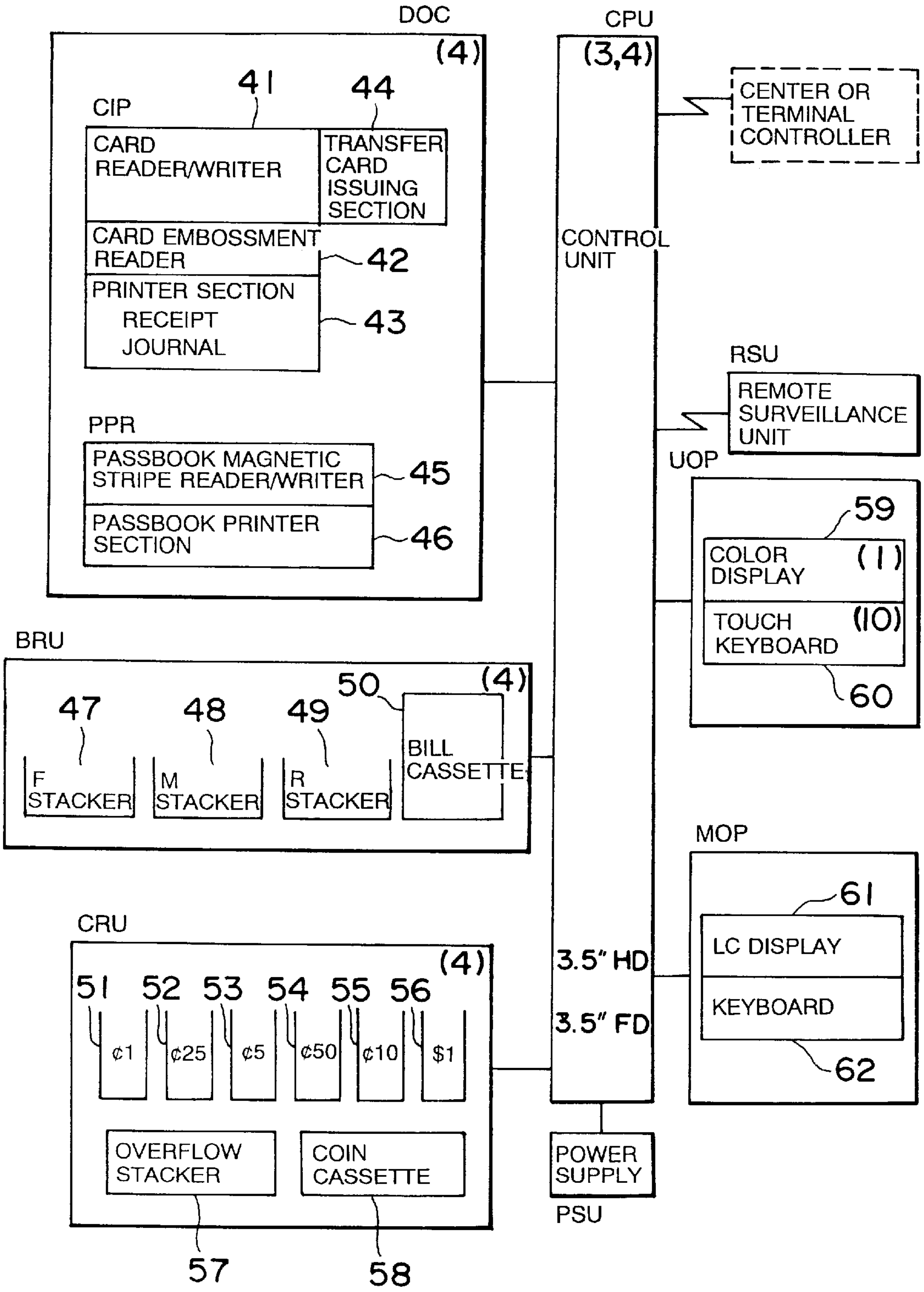
FIG. 4 is a diagram exemplarily showing the specific internal structure of the ATM in FIG. 2.

FIG. 4 shows the specific structure of the ATM.

FIG. 4 illustrates a bond output and card read/write unit DOC, a bill recycle unit BRU, a coin recycle unit CRU, a user operation unit UOP, a management operation unit MOP, a control unit CPU and a power supply unit PSU.

A part of the control unit CPU includes the portion equivalent to the operation unit 3 in FIG. 2. Another part of this control unit CPU (part of the other portion of the control unit CPU which is equivalent to the operation unit 3 in FIG. 2), the bond output and card read/write unit DOC, the bill recycle unit BRU and the coin recycle unit CRU correspond to the transaction processor 4 in FIG. 2. The control unit CPU is connected to the host computer in the center via a transmission path like a communications line, or is connected to a terminal controller to which a plurality of terminals are connected via transmission paths like communications lines and is connected to the host computer in the center via this terminal controller. The ATM communicates with the center and proceeds with a transaction while updating a book or a file where the balance of each user and transaction log are stored.

Also connected via a transmission path like a communications line to the control unit CPU is a remote surveillance unit RSU which performs the remote surveillance of the state of the ATM sited particularly in a branch, an unmanned shop (where only an ATM is placed) or the like. The remote surveillance unit RSU can monitor a plurality of ATMs and prevent problems, find a problem, attend it, and maintain the ATMs.

The bond output and card read/write unit DOC, bill recycle unit BRU and coil recycle unit CRU handle media.

The bond output and card read/write unit DOC has a card reader/writer, image reader and printer section CIP, and a passbook printer section PPR.

The card read/write, image reader and printer section CIP includes a card reader/writer 41, a card embossment reader 42, a printer section 43 and a transfer card issuing section 44.

The card reader/writer 41 reads information, such as the account number and branch number in the magnetic stripe on the card inserted in the card slot 33 for some transaction, and writes data in the magnetic stripe as needed. The card embossment reader 42 reads the name, account number, etc. in the embossed portion of the card inserted in the card slot 33 as an image. The printer section 43 prints the account number read from the card, a transaction amount, etc. on a receipt, outputs the receipt through the card slot 33, and leaves the same data as printed on the receipt as a backup or journal of printed information in the apparatus. The transfer card issuing section 44 writes transfer information, such as the payee's name, in the magnetic stripe at the back of a transfer card which is used for the transfer transaction, prints necessary information in the blank portion on the surface of the card, and issues the transfer card. This transfer card is also output from the card slot 33.

The passbook printer section PPR has a passbook magnetic stripe reader/writer 45 and a passbook printer section 46.

The passbook magnetic stripe reader/writer 45 reads and writes information from and on the magnetic stripe of the passbook inserted in the passbook slot 32, for example. The passbook printer section 46 prints the transaction log on the passbook.

The bill recycle unit BRU has, for example, three stackers 47, 48 and 49, and a bill cassette 50, and handles bills.

Of the three stackers 47–49, the stacker 47 holds 1-dollar bills, the stacker 48 holds 10-dollar bills and the stacker 49 holds 100-dollar bills, for example. In executing a withdrawal transaction, a specified amount of money is paid out through the bill slot 35 from the stackers 47–49. In executing a deposit transaction, bills inserted through the bill slot 35 are stored on the stackers 47–49 for the respective types of bills. It is assumed that 5-dollar bills, 20-dollar bills and 50-dollar bills are collected on a collection-only stacker (not shown). Further, the three stackers 47–49 exchange bills with the detachable bill cassette 50 as needed. More specifically, when even one of the three stackers 47–49 becomes short of bills due to consecutive withdrawal transactions, bills are supplemented to that stacker from the bill cassette 50, and when even one of the three stackers 47–49 becomes full of bills due to consecutive deposit transactions, bills are transferred to the bill cassette 50 from that stacker.

The coin recycle unit CRU has stackers 51, 52, 53, 54, 55 and 56 for respective coins, an overflow stacker 57 and a coin cassette 58, and handles coins. When coins should be paid out due to a transaction requiring coins, such as a withdrawal transaction or a transfer transaction, the necessary number of coins in the necessary amount are paid out through the coin slot 34 from the respective stackers 51–56. When coins are placed in the coin slot 34, those coins are stored on the respective stackers 51–56 type by type. When coins in any of the stackers 51–56 become short due to consecutive payout of coins, the coins in short are supplemented to that stacker from the coin cassette 58. When coins in any of the stackers 51–56 overflow are received on the overflow stacker 57. The overflow stacker 57 and the coin cassette 58 are detachable and are used for coin supplement and coin removal.

The user operation unit UOP has a color display device 59 as the display device 1 and a touch keyboard 60 comprising a touchpanel as the switch 10 placed over the display surface of the display device 59. That is, the display surface of the color display device 59 and the touch keyboard 60 constitute the display input section 31 in FIG. 3.

The management operation unit MOP has an liquid crystal (LC) display 61 and a keyboard 62. The management operation unit MOP, like the remote surveillance unit RSU, can grasp the internal state of the ATM and perform the necessary maintenance.

The operation of the thus constituted ATM will be described with reference to flowcharts shown in FIGS. 5 to 11 and examples of the display screen shown in FIGS. 12 to 18.

Figure 5:
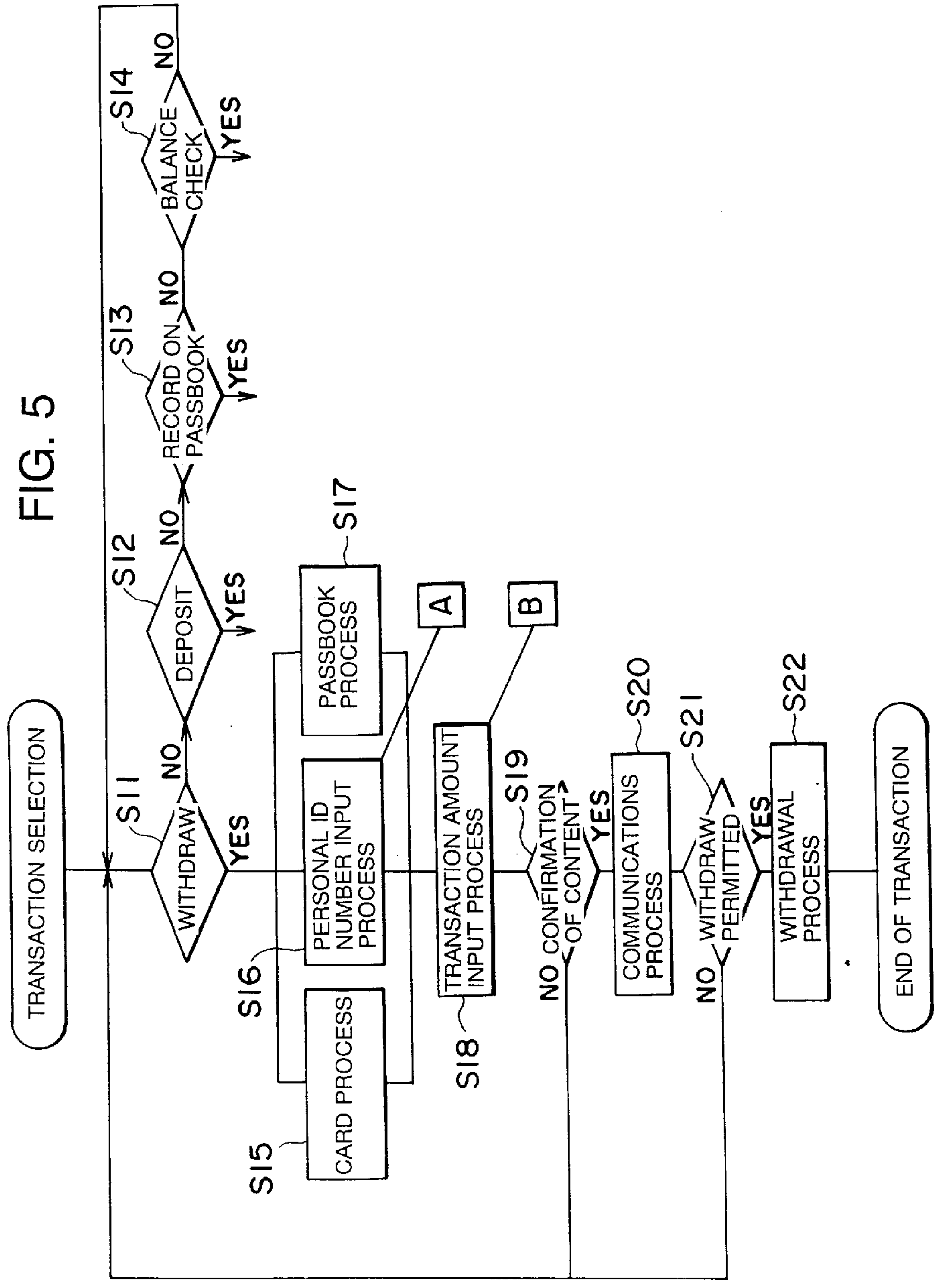
FIG. 5 is a flowchart illustrating a withdrawal operation of the ATM in FIG. 2.

FIG. 5 presents a flowchart illustrating a withdrawal process.

Figure 12:
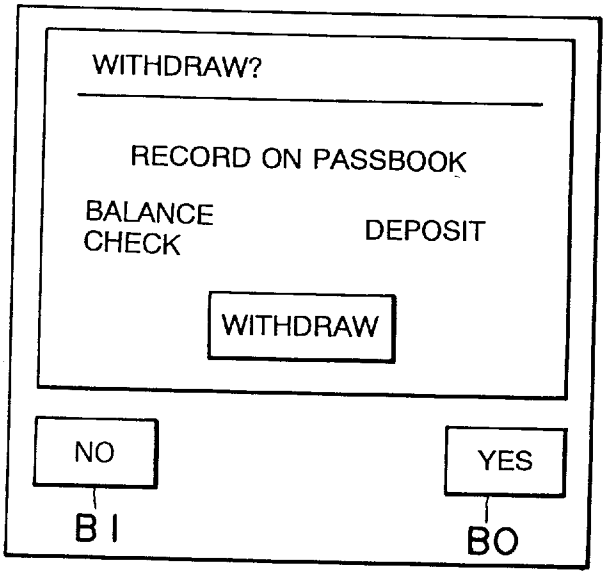
FIG. 12 is a diagram showing one example of the screen display for explaining the operation of the ATM in FIG. 2.
Figure 13:
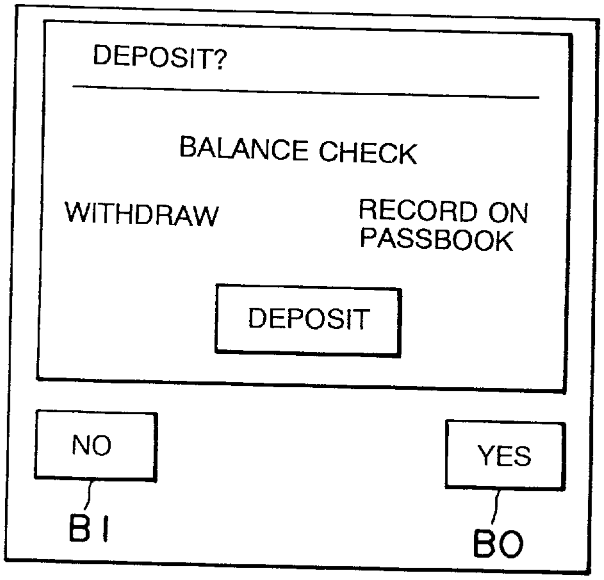
FIG. 13 is a diagram showing another example of the screen display for explaining the operation of the ATM in FIG. 2.

In operating the ATM, first, a transaction selection screen as shown in FIG. 12 or FIG. 13 for selecting the type of a transaction item is displayed on the display device 1 (the color display device 59 of the user operation unit UOP) constituting the display input section 31, requesting a user to select one of "withdrawal," "deposit," "record on passbook" and "check balance."

In this case, displayed on the screen of the display device 1 are two types of buttons, a "YES" button B0 and "NO" button B1, as an input operation section in addition to the information display screen for the input operation. When the associated portion of the button B0 or B1 on the screen is touched, the switch 10 placed over the display surface of the display device 1 (i.e., the touch keyboard 60 of the user operation unit UOP) functions to be able to input operation information of either "YES" or "NO" on the software base as if a corresponding hardware button switch is present.

This preparation of software switches allows the positions of the switches to be changed in accordance with the guidance on the screen and meets the general-purpose usage. The size of the operation portion can be increased as needed, and the increased operation portion of each switch facilitates the operation by physically handicapped users.

The "YES" button and "NO" button are limited to the software switches accomplished by the switch 10 like the touch keyboard 60, but may be constituted by individual hardware button switches provided separate from the display device 1. The hardware button switches give real operational feeling better than the software switches, so that users can surely confirm the depression operation and feel self-assured. If the keytops as the operation portions of the button switches become larger, even physically handicapped users can operate the switches more easily.

The two kinds of buttons are not limited to "YES" and "NO" but may be "Y" and "N" or "O" and "x."

In selecting a transaction, as shown in FIG. 12, the individual item names "withdrawal," "deposit," "record on passbook" and "check balance" to be selected are displayed on the screen at the bottom, on the right-hand side, at the top and on the left-hand side, respectively. The "withdrawal" at the bottom is framed to indicate that it is the input target, and a message "Withdraw?" is displayed at a predetermined portion on the screen, e.g., the uppermost portion, accordingly. The display of such a message can inform a user of the operation timing more precisely, thus improving the operability for the user. When the "YES" button B0 is depressed in this situation, the mode enters a withdrawal mode for a withdrawal transaction. When the "NO" button B1 is depressed in the state in FIG. 12, however, the selection target item is shifted to the next "deposit" and the individual item names "withdrawal," "deposit," "record on passbook" and "check balance" are shifted clockwise to be respectively displayed on the left-hand side, at the bottom, on the right-hand side and at the top, for example. The "deposit" at the bottom is framed to indicate that it is the selection target, and a message "Deposit?" is displayed at a predetermined portion on the screen, e.g., the uppermost portion, accordingly. When the "YES" button B0 is depressed in this situation, the mode enters a deposit mode for a deposit transaction. When the "NO" button B1 is depressed in the state in FIG. 13, however, the selection target item is shifted to the next "record on passbook." The selection target is repeatedly shifted in the same manner until the "YES" button B0 is depressed (steps S11, S12, S13 and S14).

The wrong selection target may be selected by mistake. To easily cope with this case, an item "cancel" may be provided on the next screen which requests the input of a personal ID number, so that when this "cancel" item is operated, the transaction is aborted and the screen returns to the initial transaction selection screen.

Further, it is a design choice to cancel the shifting of the mode to the selected transaction mode and return it to the initial transaction selection screen when the "NO" button B1 is operated before a predetermined time passes after the selection of the selection target item, for example, "deposit," i.e., until the screen changes to the next screen for the input of a personal ID number, or when the "NO" button B1 is kept operated for a predetermined period of time. With this design used, even when the wrong selection target item is selected, the correction can be made with the two kinds of buttons "YES" and "NO."

This design can allow a user to select "withdrawal," "deposit," "record on passbook," or "check balance" using only the two kinds of buttons "YES" and "NO."

As the operation is simple and easy, therefore, even users who are not well acquainted with the operation or physically handicapped users have a less chance of making erroneous operations.

However, this method takes time so that users well acquainted with the operation are likely to get irritated with the slow progress. Therefore, the apparatus is designed in such a way that when a user familiar with the operation can select "deposit" by touching the "deposit" part on the screen even if the item "withdrawal" is framed to be the input target as shown in, for example, FIG. 12. More specifically, as the touch keyboard 60 is provided on the screen so that the user's operation at the position where the item "deposit" is displayed can be detected. In this case, the operation at a position different from the display position of the "YES" or "NO" button, i.e., the operation at the display position of the item "deposit," is detected and the mode enters the deposit mode for a deposit transaction.

The other transaction items, "withdrawal," "record on passbook" and "check balance" can be selected in the same manner.

With this structure, users familiar with the operation can select the desired transaction without waiting for the desired transaction to be shifted in the frame, thus shortening the operation time and the transaction time.

Since the desired item can be selected directly, if a guidance for the direct selection is displayed at the beginning of the operation or a some fixed guidance is displayed at the lower portion of the screen even when the display at the top of the screen is changed to "Deposit?" in FIG. 13 from "Withdraw?" in FIG. 12, the user can know that the direct selection is possible. In this case, the guidance to be displayed at the lower portion of the screen may be "Touch a transaction item to select it."

The above-described processing is executed mainly by the cooperation of the input controller 11, CG unit 12, image data holding unit 13 and display controller 14 of the operation unit 3 around the data processor 15 as an equivalent function to the functions of the selection requesting unit 6 and selection processor 7.

Upon selection of "withdrawal," the insertion of a card or a passbook is requested, and when the card or passbook is inserted, a card process for a withdrawal transaction (step S15), a process for inputting the personal ID number (step S16) and a passbook process (step S17) are executed in parallel.

In executing a withdrawal transaction, first, the insertion of a card or a passbook is requested and a user should place the card in the card slot 33 or the passbook in the passbook slot 32. When the card is placed in the card slot 33, the card process in step S15 starts. When the passbook is placed in the passbook slot 32, the passbook process in step S17 is initiated. In either case, the process of entering the personal ID number in step S16 is carried out. As step S17 is enabled even during the execution of the card process in step S15, the passbook process in step S17 will be performed upon insertion of the passbook. As step S15 is enabled even during the execution of the passbook process in step S17, the card process in step S15 will be performed upon insertion of the card.

Figure 6:
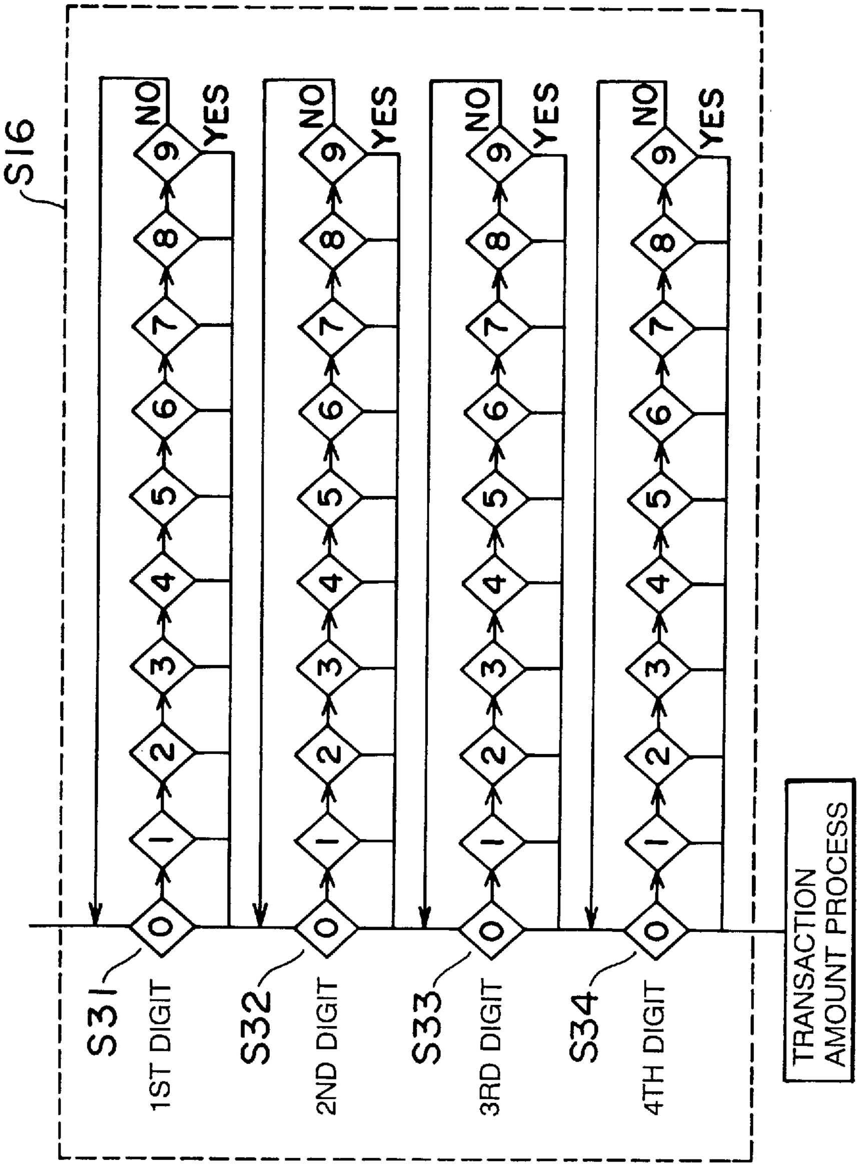
FIG. 6 is a flowchart illustrating an operation of the ATM in FIG. 2, associated with the input of a personal ID (Identification) number.

FIG. 6 shows the details of the process of entering the personal ID number in step S16.

Figure 14:
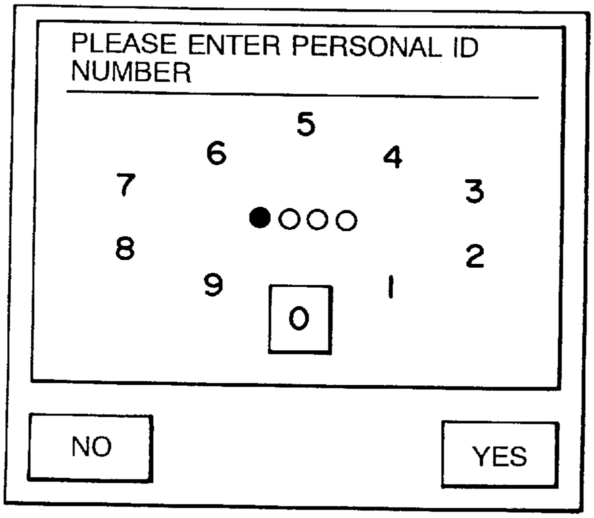
FIG. 14 is a diagram showing a further example of the screen display for explaining the operation of the ATM in FIG. 2.
Figure 15:
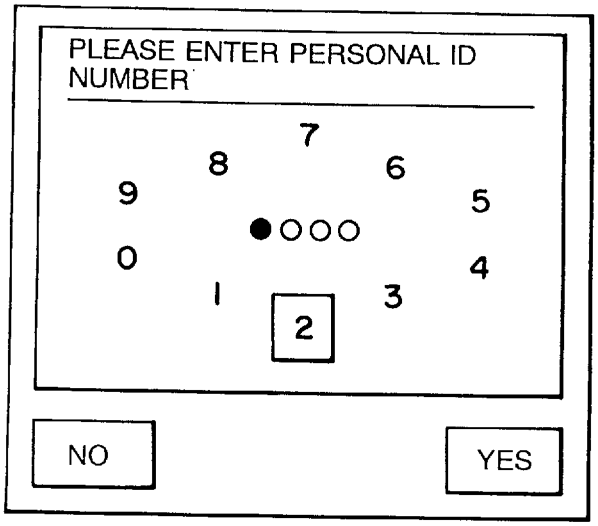
FIG. 15 is a diagram showing a different example of the screen display for explaining the operation of the ATM in FIG. 2.

When the process of entering the personal ID number starts, the screen for selectively entering the personal ID number is displayed on the display device 1 which constitutes the display input section 31, requesting a user to select a numeral for each digit of the personal ID number consisting of, for example, four digits, as shown in FIGS. 14 and 15.

In this case too, two types of buttons, the "YES" button B0 and "NO" button B1, as an input operation section are displayed on the screen of the display device 1 in addition to the information display screen for the input operation. As the associated portion of the button B0 or B1 on the screen is touched, the switch 10 placed over the display surface of the display device 1 functions to permit the operation information of either "YES" or "NO" to be input.

At the time of inputting the personal ID number, a message "Please enter personal ID number" is displayed at a predetermined portion on the screen, e.g., at the topmost portion, and the input digit of the personal ID number is displayed nearly at the center of the screen in the form of "●" (entered) and "0" (unentered) as shown in FIG. 14, for example. In inputting the first digit of the personal ID number, the input digit position is indicated to be the first digit by "●000" on the screen and numerals from "0" to "9" are arranged counterclockwise in a loop at the proper intervals with "0" at the bottom center, as shown in FIG. 14. At this time, the numeral "0" at the bottom center, for example, is framed to indicate it as the current selection target. When the "YES" button B0 is depressed under this situation, "0" is entered as the first digit of the personal ID number and the process proceeds to the step of entering the next digit. When the "No" button B1 is depressed in the state in FIG. 14, on the other hand, the numerals "0" to "9" are shifted clockwise, for example, by one step, and "1," for example, now displayed at the bottom center is framed, indicating that it is the current selection target. When the "YES" button B0 is depressed under this situation, "1" is entered as the first digit of the personal ID number and the process proceeds to the step of entering the next digit. When the "No" button B1 is depressed in this state, the selection target is shifted to the next numeral "2" and the numerals "0" to "9" are shifted further clockwise, for example, by one step. As a result, "2," for example, now displayed at the bottom center is framed, indicating that it is the current selection target, as shown in FIG. 15. Likewise, the shifting of the selection target is repeated until the "YES" button B0 is depressed (step S31).

When the first digit of the personal ID number is input by the selection of "YES" or "NO" in this manner in step S31, the display of the input digit position is changed to "●●00" indicating that the second digit is the current input digit position, and the selectable numerals from "0" to "9" arranged in a loop are rotated clockwise in the same manner as described previously for the first digit. The numeral at the bottom center is changed one by one from "0" to "9" and the shifting of the selection target is repeated until the "YES" button B0 is depressed (step S32).

When the second digit of the personal ID number is likewise input by the selection of "YES" or "NO" in step S32, the display of the input digit position is changed to "●●●0" indicating that the third digit is the current input digit position, and the selectable numerals from "0" to "9" arranged in a loop are rotated clockwise in quite the same manner as described above for the first digit. The numeral at the bottom center is changed one by one from "0" to "9" and the shifting of the selection target is repeated until the "YES" button B0 is depressed (step S33).

When the third digit of the personal ID number is input by the selection of "YES" or "NO" in step S33, the display of the input digit position is changed to "●●●●" indicating that the fourth digit is the current input digit position, and the selectable numerals from "0" to "9" arranged in a loop are rotated clockwise in the same manner as described previously for the first digit. The numeral at the bottom center is changed one by one from "0" to "9" and the shifting of the selection target is repeated until the "YES" button B0 is depressed (step S34).

If the wrong personal ID number is input, the apparatus detects upon the entry of the personal ID number that the input personal ID number differs from the real or intended personal ID number, displays a guidance on the screen requesting the reentry of the personal ID number and returns the screen for inputting the initial personal ID number.

To cope with the case where the user becomes aware of having entered the wrong personal ID number before the apparatus checks the entered personal ID number, however, the "CORRECT" button should be provided on the screen for inputting the personal ID number. The apparatus may be designed in such a manner that when the user becomes aware of having entered the wrong personal ID number and operates this "CORRECT" button, all the input digits of the personal ID number are ignored or just the one digit previously entered is ignored. This way, the user can easily cope with the entry of the wrong personal ID number.

It is more preferable that the apparatus is designed in such a way that if the user operates the "NO" button B1 before the apparatus displays a guidance on the screen indicating the input of the wrong personal ID number or if the user keeps operating the "NO" button B1 for a predetermined period of time, all the input digits of the personal ID number are ignored and the screen returns to the screen for inputting the personal ID number to guide the entry of the personal ID number. To prevent the illegal or unauthorized use of a card picked up or stolen, general existing automated transaction apparatuses are designed so that if the wrong personal ID number is entered a predetermined number of times (e.g., three times) in row, the card is returned to the user and if such wrong entry is repeated a predetermined number of times (e.g., three times), the card becomes no longer usable. If the entry of the personal ID number can be canceled by inputting a request to correct the personal ID number before the screen having the guidance to indicate the wrong personal ID number is displayed, as described above, it is possible to prevent the card from becoming unusable intentionally.

When the "NO" button B1 is kept operated for a predetermined period of time, the digits up to the one immediately before the digit for which the selected numeral should be ignored are made valid and a guidance requesting the input of the next digit is displayed. In other words, when the "NO" button B1 is kept operated for a predetermined period of time at the time the third digit of the personal ID number has been entered, the numeral entered for the third digit is ignored and the reentry of the numeral for the third digit is permitted, so that the digits having already entered up to the occurrence of that event, namely the first and second digits, are made valid and the user need only to enter the numerals for the subsequent third and fourth digits. This can quicken and facilitate the correction process. With this design, the correction can also be made effectively with the two kinds of buttons "YES" and "NO."

Accordingly, a user can enter the personal ID number consisting of, for example, four digits merely by the selective operation of the two kinds of buttons "YES" B0 and "NO" B1.

As the operation is simple and easy, therefore, even users who are not well acquainted with the operation or physically handicapped users have a less chance of making erroneous operations.

With this method, however, the operation takes much time so that users well acquainted with the operation are likely to get irritated with the slow progress. The apparatus is therefore designed in such a way that, for example, a user familiar with the operation can select "1" by touching the "1" part on the screen even if "0" is framed and is the input target. More specifically, as the touch keyboard 60 is provided on the screen so that the user's operation at the position where "1" is displayed can be detected. In this case, the operation at a position different from the display position of the "YES" or "NO" button, i.e., the operation at the display position of "1," is detected, so that the display for the input digit position is changed to "●000" indicating that the input digit position is the first digit. The user likewise operates directly at the numeral-displayed positions until the fourth input digit is entered.

With this structure, users familiar with the operation can select the desired transaction without waiting for the desired transaction to be shifted in the frame, thus shortening the operation time and the transaction time.

Since numerals can be selected directly, if a guidance for the direct selection is displayed at the beginning of the operation, or at the lower portion of the screen in FIGS. 14 and 15, the user can know that the direct selection is possible. In this case, the guidance to be displayed may be "Touch a numeral to select it."

The above-described processing is also executed mainly by the cooperation of the input controller 11, CG unit 12, image data holding unit 13 and display controller 14 of the operation unit 3 around the data processor 15 as an equivalent function to the functions of the selection requesting unit 6 and selection processor 7.

When the personal ID number is entered in step S16, the process of inputting the transaction amount is executed after verifying the personal ID number against the data on the card or the passbook (step S18).

Figure 7:
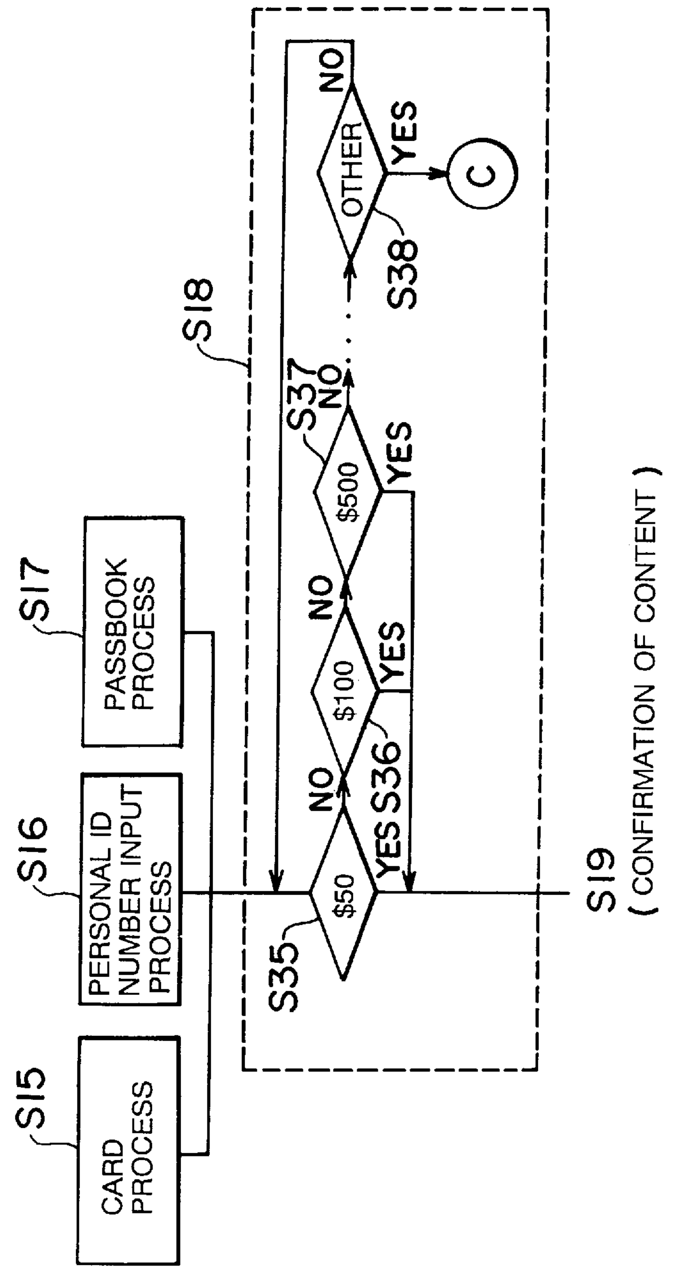
FIG. 7 is a flowchart illustrating an operation of the ATM in FIG. 2, associated with the input of a transaction amount.
Figure 8:
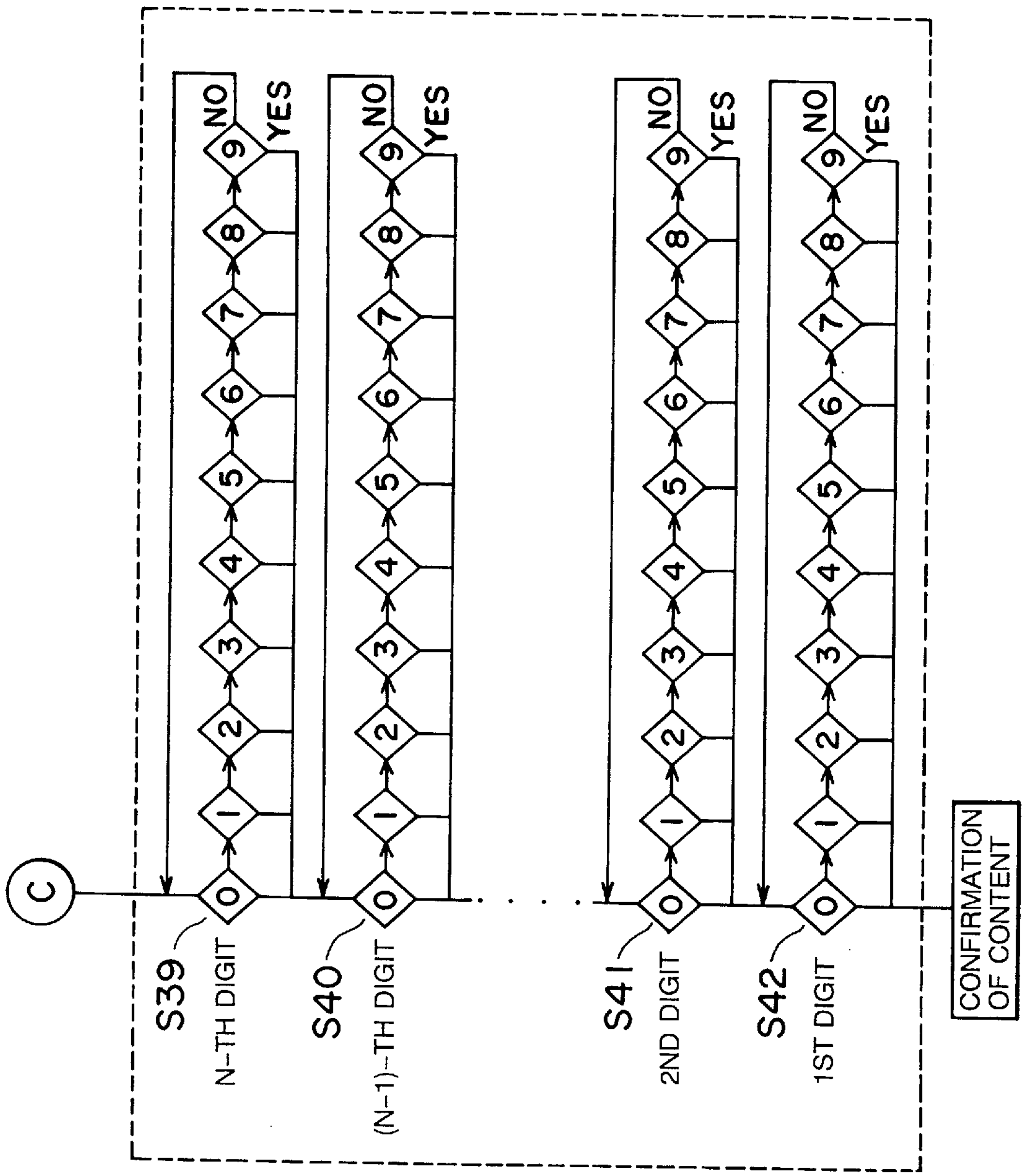
FIG. 8 is a flowchart illustrating an operation of the ATM in FIG. 2, associated with the selective input of an amount.

FIGS. 7 and 8 show the details of the transaction amount inputting process in step S18.

When the entry of the personal ID number is completed and the transaction amount inputting process starts, the screen for selectively entering the transaction amount is displayed on the display device 1 of the display input section 31, requesting a user to select, for example, "$50," "$100," "$500," "$1,000" or "other."

In this case too, two types of buttons, the "YES" button B0 and "NO" button B1, as an input operation section are displayed on the screen of the display device 1 in addition to the information display screen for the input operation. As the associated portion of the button B0 or B1 on the screen is touched, the switch 10 placed over the display surface of the display device 1 functions to permit the operation information of either "YES" or "NO" to be input.

Figure 16:
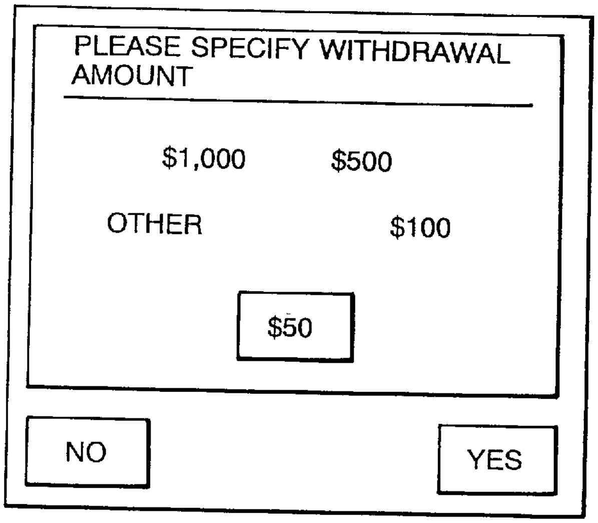
FIG. 16 is a diagram showing a different example of the screen display for explaining the operation of the ATM in FIG. 2.

At the time of inputting the transaction amount, a message "Please specify withdrawal amount" is displayed at a predetermined portion on the screen, e.g., at the topmost portion, and "$50," "$100," "$500," "$1,000" and "other" to be selected are arranged counterclockwise in a loop at the proper intervals with "$50" at the bottom center, as shown in FIG. 16. At this time, "$50" displayed at the bottom center, for example, is framed to indicate it as the current selection target (step S35). When the "YES" button B0 is depressed under this situation (step S35), "$50" is entered as the withdrawal amount and the transaction amount inputting process is completed to proceed to the next process. When the "No" button B1 is depressed in the state in FIG. 16 (step S35), on the other hand, the selection target is shifted to "$100" and the transaction amounts "$50" to "other" on the screen are shifted clockwise, for example, by one step. As a result, "$100," for example, now displayed at the bottom center is framed, indicating that it is the current selection target (step S36). When the "YES" button B0 is depressed under this situation (step S36), "$100" is entered as the withdrawal amount and the process proceeds to the next process. When the "No" button B1 is depressed in this state (step S36), the selection target is shifted to the next "$500" and the transaction amounts "$50" to "other" on the screen are shifted further clockwise, for example, by one step. As a result, "$500," for example, now displayed at the bottom center is framed, indicating that it is the current selection target (step S37). When the "YES" button B0 is depressed under this situation (step S37), "$500" is entered as the withdrawal amount and the process proceeds to the next process. Likewise, the shifting of the selection target is repeated until the "YES" button B0 is depressed. When the "No" button B1 is depressed when the selection target is "other" (step S38), the selection target is shifted to the first target, "$50," and the transaction amounts "$50" to "other" on the screen are shifted clockwise, for example, by one step. As a result, "$50," for example, now displayed at the bottom center is framed, indicating that it is the current selection target (step S35). When the "YES" button B0 is depressed when the selection target is "other" (step S38), the process proceeds to the amount specifying process shown in FIG. 8.

Figure 17:
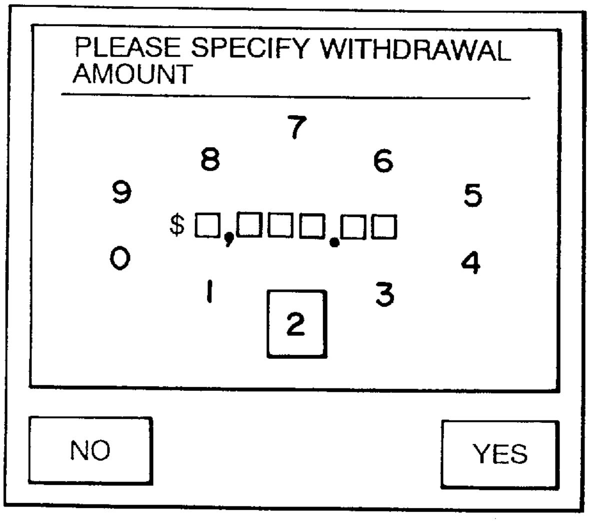
FIG. 17 is a diagram showing a different example of the screen display for explaining the operation of the ATM in FIG. 2.
Figure 18:
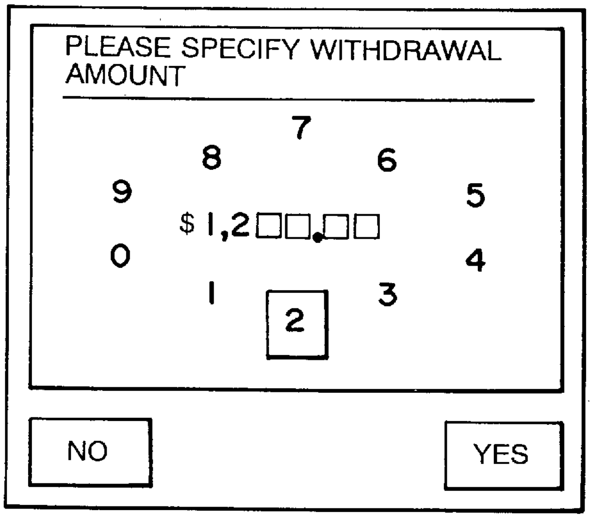
FIG. 18 is a diagram showing a different example of the screen display for explaining the operation of the ATM in FIG. 2.

When the amount specifying process starts, the amount specifying screen for selectively entering the transaction amount is displayed on the display device 1 of the display input section 31, as shown in FIG. 17. More specifically, while a message "Please specify withdrawal amount" is displayed at a predetermined portion on the screen, e.g., at the topmost portion, the input digit position of the specified amount is displayed nearly at the center of the screen in the form of predetermined digits of "□" (unentered) or a numeral (entered) as shown in FIGS. 17 and 18, for example. At the time of inputting the most significant digit or the n-th digit of the amount, the input digit position is indicated to be the n-th digit (e.g., the position of $1,000) by displaying n digits of "□" on the screen, and numerals from "0" to "9" to be selected are arranged counterclockwise in a loop at the proper intervals with the selection target value ("2" in the diagram) at the bottom center, as shown in FIG. 17. At this time, the numeral "2" at the bottom center, for example, is framed to indicate it as the current selection target. When the "YES" button B0 is depressed under this situation, "2" is entered as the n-th digit of the specified amount and the process proceeds to the step of entering the next digit. When the "No" button B1 is depressed in the state in FIG. 17, on the other hand, the selection target is shifted to the next numeral "3" and the numerals "0" to "9" are shifted clockwise, for example, by one step. As a result, "3," for example, now displayed at the bottom center is framed, indicating that it is the current selection target. When the "YES" button B0 is depressed under this situation, "3" is entered as the n-th digit of the specified amount and the process proceeds to the step of entering the next digit. When the "No" button B1 is depressed in this state, shifting the selection target to the next numeral, the numerals "0" to "9" are shifted further clockwise, for example, by one step and the numeral now displayed at the bottom center is framed, indicating that it is the current selection target. Likewise, the shifting of the selection target is repeated until the "YES" button B0 is depressed (step S39).

When the n-th digit of the specified amount is input by the selection of "YES" or "NO" in this manner in step S39, the display of the input digit position is changed to indicate that the (n−1)-th digit is the current input digit position, and the selectable numerals from "0" to "9" arranged in a loop are rotated clockwise in quite the same manner as described previously for the n-th digit. The numeral at the bottom center is changed one by one from "0" to "9" and the shifting of the selection target is repeated until the "YES" button B0 is depressed (step S40).

Likewise, when the (n−1)-th digit of the specified amount is input by the selection of "YES" or "NO" in this manner in step S40, the display of the input digit position is changed to indicate that the (n−2)-th digit is the current input digit position, and the selectable numerals from "0" to "9" arranged in a loop are rotated clockwise in quite the same manner as described previously for the (n−1)-th digit. The numeral at the bottom center is changed one by one from "0" to "9" and the shifting of the selection target is repeated until the "YES" button B0 is depressed.

When the process is repeated and the third digit of the specified amount is now input by the selection of "YES" or "NO" in this manner, the display of the input digit position is changed to indicate that the second digit is the current input digit position, and the selectable numerals from "0" to "9" arranged in a loop are rotated clockwise in quite the same manner as described previously for the (n−2)-th digit. The numeral at the bottom center is changed one by one from "0" to "9" and the shifting of the selection target is repeated until the "YES" button B0 is depressed (step S41).

Further, when the second digit of the specified amount is input by the selection of "YES" or "NO" in this manner in step S41, the display of the input digit position is changed to indicate that the least significant digit or the first digit is the current input digit position, and the selectable numerals from "0" to "9" arranged in a loop are rotated clockwise in quite the same manner as described previously for the second digit. The numeral at the bottom center is changed one by one from "0" to "9" and the shifting of the selection target is repeated until the "YES" button B0 is depressed (step S42).

To cope with the case where the user enters the wrong amount, however, the "CORRECT" button should be provided on the transaction amount inputting screen so that when the user operates this "CORRECT" button, all the input digits of the entered amount are ignored or just the one digit previously entered is ignored. This allows the user to easily correct the transaction amount. The "CORRECT" button may be provided on the screen which is displayed after the entry of the transaction amount to show the entered transaction amount for confirmation, so that when the user operates this "CORRECT" button, all the input digits of the entered amount are ignored. This allows the user to easily correct the transaction amount and to easily cope with the erroneous entry of the transaction amount.

The apparatus may also be designed in such a way that if the user operates the "NO" button B1 before a predetermined time passes after the entry of the transaction amount or before the screen changes to the next screen which shows the entered transaction amount for confirmation, no cashing based on the entered transaction amount is performed and the screen returns to the transaction amount inputting screen, requesting the user to reenter the transaction amount. Alternatively, the "YES" and "NO" buttons may be provided in a selectable manner on the screen which is displayed after the entry of the transaction amount for confirmation of the transaction amount, e.g., on the screen which shows "Withdraw $1,200?" so that when the "NO" button is operated, the numerals for all the digits of the entered amount are ignored. This design allows the user to correct the transaction amount merely by selectively operating the two kinds of buttons "YES" and "NO," thus providing an easier means of coping with the entry of the wrong transaction amount.

When the "NO" button B1 is kept operated for a predetermined period of time at the time of inputting the transaction amount, only the previously entered numeral in the transaction amount is ignored. That is, in the case where "12" have been selected and entered as shown in FIG. 18, when the "NO" button B1 is kept operated for a predetermined period of time, only "1" is made valid and "2" is ignored so that the user should start entering the amount from the second digit. Even when the wrong transaction amount is entered, the user can correct it simply using the two kinds of buttons "YES" and "NO," thus ensuring an easier means of coping with the entry of the wrong transaction amount.

Accordingly, any user can enter the transaction amount consisting of, for example, six digits merely by the selective operation of the two kinds of buttons "YES" and "NO."

As the operation is simple and easy, therefore, even users who are not well acquainted with the operation or physically handicapped users have a less chance of making erroneous operations.

With this method, however, the operation takes much time so that users well acquainted with the operation are likely to get irritated with the slow progress. The apparatus is therefore designed in such a way that a user familiar with the operation can select "5" by touching the "5" part on the screen even if "2" is framed and is the input target as shown in FIG. 18. More specifically, as the touch keyboard 60 is provided on the screen so that the user's operation at the position where "5" is displayed can be detected. In this case, the operation at a position different from the display position of the "YES" or "NO" button, i.e., the operation at the display position of "5," is detected, so that "5" is entered. In other words, with "12" having already been selected, if the user operates at the position where "5" is displayed, "5" is selected and the numeral becomes "125." This is true of the other numerals "1," "2," "3," "4," "6," "7," "8," "9" and "0."

With this structure, users familiar with the operation can select the desired numeral without waiting for the desired numeral to be shifted in the frame, thus shortening the operation time and the transaction time.

Since items can be selected directly, if a guidance for the direct selection is displayed at the beginning of the operation, or at the lower portion of the screen in FIGS. 17 and 18, the user can know that the direct selection is possible. In this case, the guidance to be displayed may be "Directly touch a numeral to select it."

FIG. 18 shows that the position of $10 is specified, $1200 has already been input and the current selection target is "2."

The above-described processing is also executed mainly by the cooperation of the input controller 11, CG unit 12, image data holding unit 13 and display controller 14 of the operation unit 3 around the data processor 15 as an equivalent function to the functions of the selection requesting unit 6 and selection processor 7.

When the specified amount is input in step S18 (including steps S35 to S42), the user is given a chance to confirm the transaction amount (step S19).

If the user depresses the "NO" button B1 in step S19, the process returns to the initial transaction selection and if the user depresses the "YES" button B0, the transaction processor 4 (control unit CPU) performs a communications process with the host machine (step S20), allowing the user to confirm whether or not to withdraw the amount (step S21).

If the user depresses the "NO" button B1 in step S21, the process returns to the initial transaction selection and if the user depresses the "YES" button B0, the transaction processor 4 (control unit CPU) executes the withdrawal process (step S22).

In the withdrawal process in step S22, the card and receipt processed by the card read/write, image reader and printer section CIP of the bond output and card read/write unit DOC are discharged from the card slot 33. When the user removes the card and receipt, cashes are discharged from the bill slot 35 and coin slot 34 after processing in the bill recycle unit BRU and the coin recycle unit CRU, terminating the transaction.

When the depression of a button by the user has not been detected for a predetermined time on each of the transaction selecting screen, personal ID number inputting screen and transaction amount inputting screen, the transaction may be terminated and the operation screen may be returned to the initial screen before the transaction has started. Even if the user abort the transactional operation or even if the user cannot continue performing the transactional operation during transaction for some reasons, this design allows the operation screen to return to the initial screen when the predetermined time passes, thus permitting an operation for the next transaction. In this case, even when the user or client leaves the ATM with the personal ID number already entered, it is unlikely that cashes will be withdrawn illegally by the next user as long as the predetermined time passes. This contributes to preventing a transactional crime.

The apparatus may be modified in such a manner that in the case where selection items are arranged in a loop and a selection target is shifted cyclically until the "YES" button is depressed the selection item may be shifted automatically even without the user's depressing "YES" button every time a proper prescribed time (which does not necessarily match with the aforementioned time for automatically returning the screen to the previous screen to the execution of the transaction). This design allows a user to depress the "YES" button to proceed the transaction only when the selection target comes to the desired selection item instead of depressing the "NO" button for each selection target, and needs very few operations by the user.

In this case, when the number of cyclic shifts of the selection target along the loop reaches a predetermined value, the transaction may be stopped and the operation screen may then return to the initial screen. When a user aborts the operation during the selection of selection items, the next user can execute a transaction if a given time passes.

Figure 9:
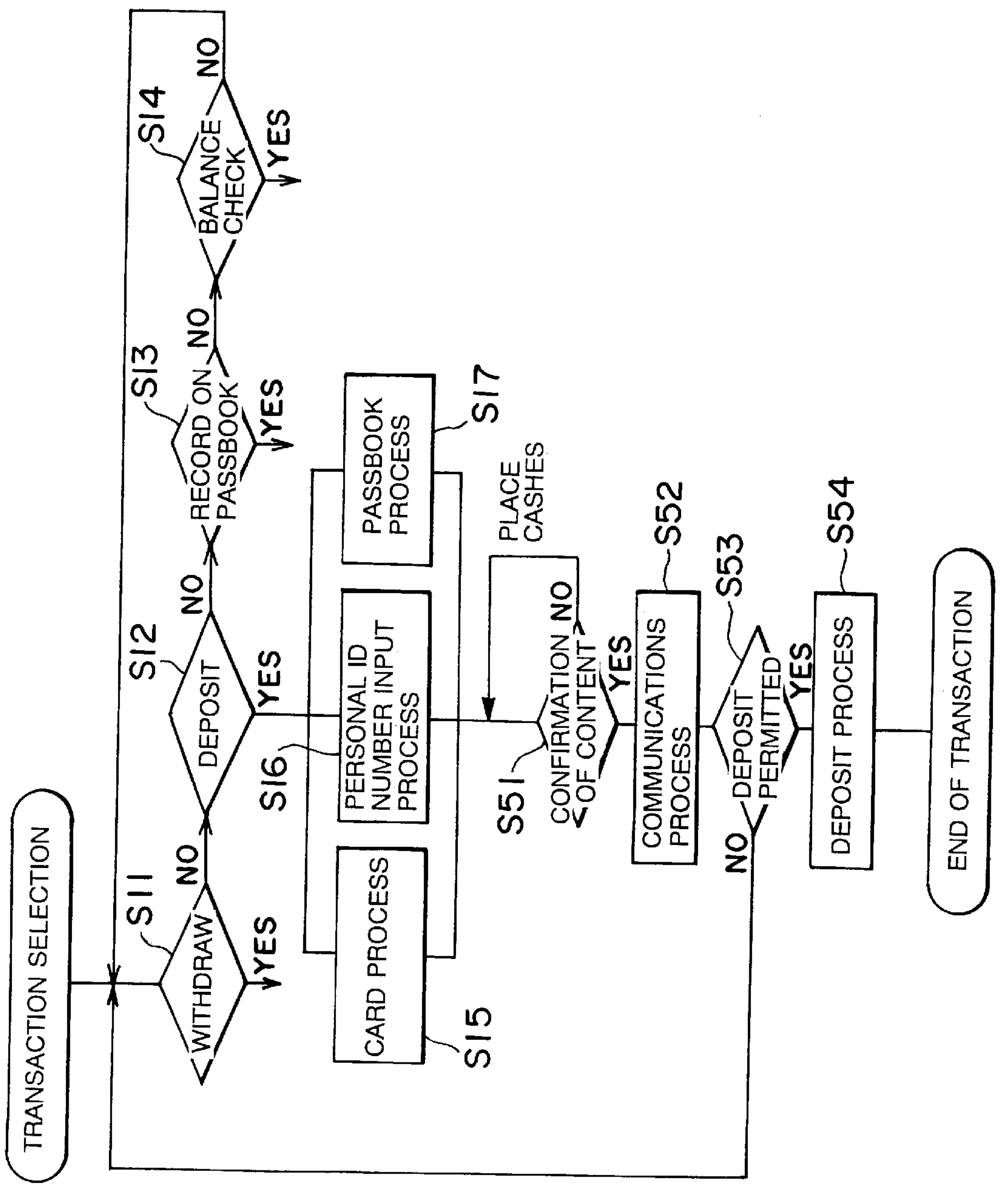
FIG. 9 is a flowchart illustrating an operation of the ATM in FIG. 2, associated with a deposit.

FIG. 9 presents a flowchart illustrating the deposit process in this ATM.

When the deposit is selected in the transaction selection in steps S11, S12, S13 and S14, the insertion of a card or a passbook is requested, and when the card or passbook is inserted, a card process for a withdrawal transaction (step S15), a process for inputting the personal ID number (step S16) and a passbook process (step S17) are executed in parallel, as in the case of the withdrawal transaction.

In executing a deposit transaction, first, the insertion of a card or a passbook is requested and a user should place the card in the card slot 33 or the passbook in the passbook slot 32. When the card is placed in the card slot 33, the card process in step S15 starts. When the passbook is placed in the passbook slot 32, the passbook process in step S17 is initiated. In either case, the process of entering the personal ID number in step S16 is carried out. As step S17 is enabled even during the execution of the card process in step S15, the passbook process in step S17 will be performed upon insertion of the passbook. As step S15 is enabled even during the execution of the passbook process in step S17, the card process in step S15 will be performed upon insertion of the card.

When the personal ID number is entered in step S16, this personal ID number is verified against the data on the card or the passbook, and then a cashing process of placing the cashes in the bill slot 35 and the coin slot 34 and requesting the confirmation of the amount is performed (step S51). In step S51, the confirmation is repeated executed until the amount intended by the user is correctly placed. The placed cashes are processed by the bill recycle unit BRU and the coin recycle unit CRU.

If the user depresses the "YES" button B0 in step S51, the transaction processor 4 (control unit CPU) performs a communications process with the host machine (step S20), allowing the user to confirm whether or not to deposit the amount (step S53).

If the user depresses the "NO" button B1 in step S53, the process returns to the initial transaction selection and if the user depresses the "YES" button B0, the transaction processor 4 (control unit CPU) executes the deposit process (step S54).

In the deposit process in step S54, the card and receipt processed by the card read/write, image reader and printer section CIP of the bond output and card read/write unit DOC are discharged from the card slot 33, terminating the deposit transaction.

Figure 10:
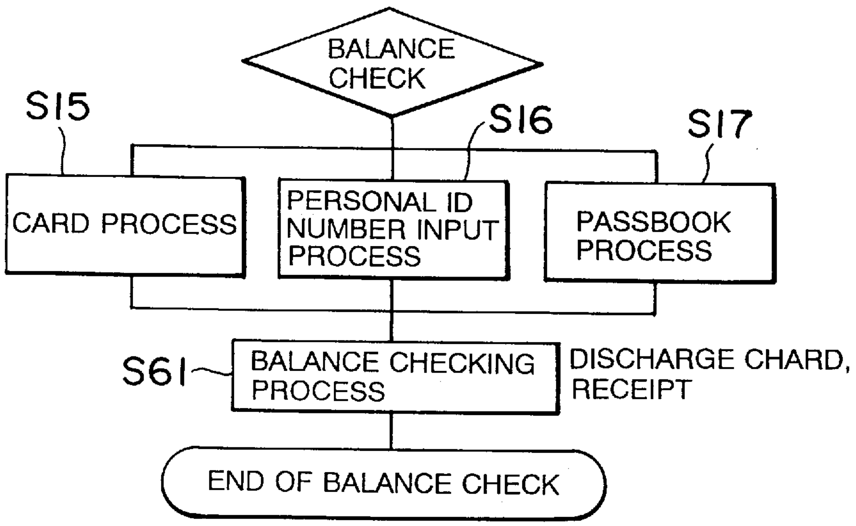
FIG. 10 is a flowchart illustrating an operation of the ATM in FIG. 2, associated with a balance collation.

FIG. 10 presents a flowchart illustrating the balance checking process in this ATM.

When the balance check is selected in the transaction selection in steps S11, S12, S13 and S14, the insertion of a card or a passbook is requested, and when the card or passbook is inserted, a card process for a withdrawal transaction (step S15), a process for inputting the personal ID number (step S16) and a passbook process (step S17) are executed in parallel, as in the case of the deposit transaction.

In executing the balance checking process, first, the insertion of a card or a passbook is requested and a user should place the card in the card slot 33 or the passbook in the passbook slot 32. When the card is placed in the card slot 33, the card process in step S15 starts. When the passbook is placed in the passbook slot 32, the passbook process in step S17 is initiated. In either case, the process of entering the personal ID number in step S16 is carried out. As step S17 is enabled even during the execution of the card process in step S15, the passbook process in step S17 will be performed upon insertion of the passbook. As step S15 is enabled even during the execution of the passbook process in step S17, the card process in step S15 will be performed upon insertion of the card.

When the personal ID number is entered in step S16, this personal ID number is verified against the data on the card or the passbook, and the transaction processor 4 (control unit CPU) communicates with the host machine to execute the balance checking process to collate the balance in the account in question (step S61).

In the balance checking process in step S61, the card and receipt processed by the card read/write, image reader and printer section CIP of the bond output and card read/write unit DOC are discharged from the card slot 33, terminating the balance checking.

Figure 11:
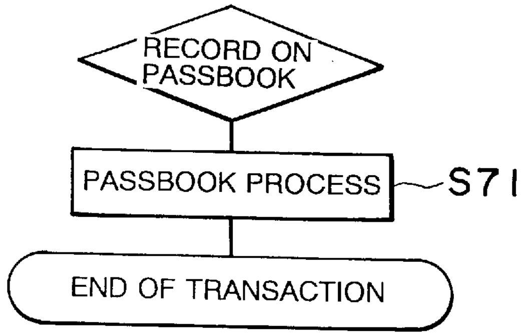
FIG. 11 is a flowchart illustrating an operation of the ATM in FIG. 2, associated with the writing of a passbook.

FIG. 11 presents a flowchart illustrating the process of recording data on a passbook in this ATM.

When the data recording on a passbook is selected in the transaction selection in steps S11, S12, S13 and S14, the insertion of a passbook is requested, and when the passbook is inserted in the passbook slot 32, the transaction processor 4 (control unit CPU) communicates with the host machine to obtain data unregistered on the passbook, and records the data on the passbook (step S71).

In the process of recording data on the passbook in step S71, the passbook processed by the passbook printer PPR of the bond output and card read/write unit DOC is discharged from the passbook slot 32, terminating the recording.

The above-described ATM can allow users to perform the transfer transaction merely by selectively operating the two kinds of buttons "YES" and "NO," so that any user can easily perform the desired transaction. This ATM provides an improved and easier operation particularly for users who are not familiar with the apparatus.

Although the foregoing description of this embodiment has been given on the automated transaction apparatus which allows users to execute the withdrawal, deposit, data recording on a passbook and balance check in a selectable manner, the automated transaction apparatus may be designed to be able to further execute a transfer transaction.

The transfer transaction requires the entry of the payer's name, the payee's name, the account number of the payee, and the like. Particularly, the name of Japanese should be input in Japanese "kana," i.e.,"katakana" or "hiragana," and it is not practical for each user to enter the name by selecting each "kana" from among 50 "kana" letters as in the above-described embodiment. In executing a transfer transaction, generally, information about the transfer transaction is input to execute the transaction only in the first transfer transaction, the information about the transaction is registered once on a card or in the center after the transaction, so that the same information about the transaction is used for later transfer transactions for the same payee.

Accordingly, if a user inputs the information about the transaction and registers that information on a card or in the center with the assistance of a bank employee only in the first transfer transaction, the user can utilize the same information about the transaction for later transfer transactions for the same payee. If the screen showing the information about registered transfer transactions is displayed using the card or the center with "YES" and "NO" buttons provided on this screen, the user needs merely select the "YES" or "NO" button to choose the execution or abortion of the transaction. This structure can allow any user to easily execute a transfer transaction using two kinds of buttons "YES" and "NO."

It is often the case that the same amount of money is transferred to the same payee. In registering the information about a transfer transaction on a card or in the center, therefore, the amount may be registered together so that when the amount differs from the intended one on the screen for the confirmation of the information about the transfer transaction, the user should select the "NO" button and can input the correct transaction amount digit by digit using the "YES" and "NO" buttons. This design can ensure a simpler and more general-purpose means to execute transfer transactions.

This apparatus corresponds to the automated transaction apparatus according to the first aspect of this invention described earlier. In this apparatus, the selection requesting unit 6 requests a user to input information in an alternative style via the display device 1, and the selection processor 6 performs a predetermined process based on information, selectively input by the user through the display device 1 and the input device 2, and the internal state, whereby the user should simply perform the alternative operation. That is, the actual operation the user has to perform is very simple. Therefore, even a user who is not familiar with the operation or who has a difficulty in performing the operation can easily and surely operate the apparatus.

As every input associated with each transaction can be made in an alternative style using two buttons "YES" and "NO," thus eliminating the need for the provision of other buttons. This can permit two large buttons to be arranged with some distance therebetween. With this structure, even users who suffer injured upper limbs or unsmooth movement thereof are unlikely to perform an erroneous operation. Further, this structure improves the operability and contributes to shortening the operation time.

Furthermore, to cope with the situation where fine operations cannot be expected as in the case where the automated transaction apparatus is placed in a so-called drive-through shop or the like, this structure can ensure adequate operations and improve the operability.

This apparatus corresponds to the automated transaction apparatus according to the second aspect of this invention described earlier. In this apparatus, the operation unit 3 causes the selection requesting unit 6 to request a user to make every information input in an alternative style, so that the user should simply operate only the input device 2 in an alternative style to input every information. This can allow even a user who has a difficulty in performing the operation to easily and surely operate the apparatus.

The input device which provides the alternative input operation may be provided with two large special-purpose buttons with some distance therebetween or a special-purpose switch which can be flipped up and down or right and left to effect the alternative input operation. This further reduces the chance for users to perform erroneous operations, thus improving the operability.

The apparatus corresponds to the automated transaction apparatus according to the third aspect of this invention as described earlier. In this apparatus, the input device 2 has the selection input unit 5 which performs an alternative information input by selecting one of two kinds of operation styles. This makes clearer the alternative operation the user should perform, thus ensuring easier and surer operations.

Third Embodiment

Figure 19:
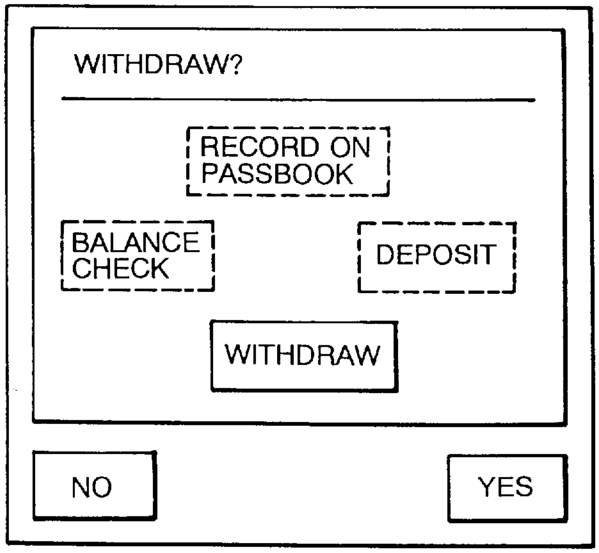
FIG. 19 is a diagram showing one example of the screen display for explaining the operation of an ATM according to a third embodiment of this invention.

An automated transaction apparatus according to a third embodiment of this invention provides the display section for displaying the selectable items "withdrawal," "deposit," etc. with the button function in addition to the "YES" and "NO" buttons provided on the transaction type selecting screen, as shown in FIG. 19. Accordingly, a user can arbitrarily select the alternative type by the selection of "YES" or "NO" or the direct selection of each item.

Figure 20:
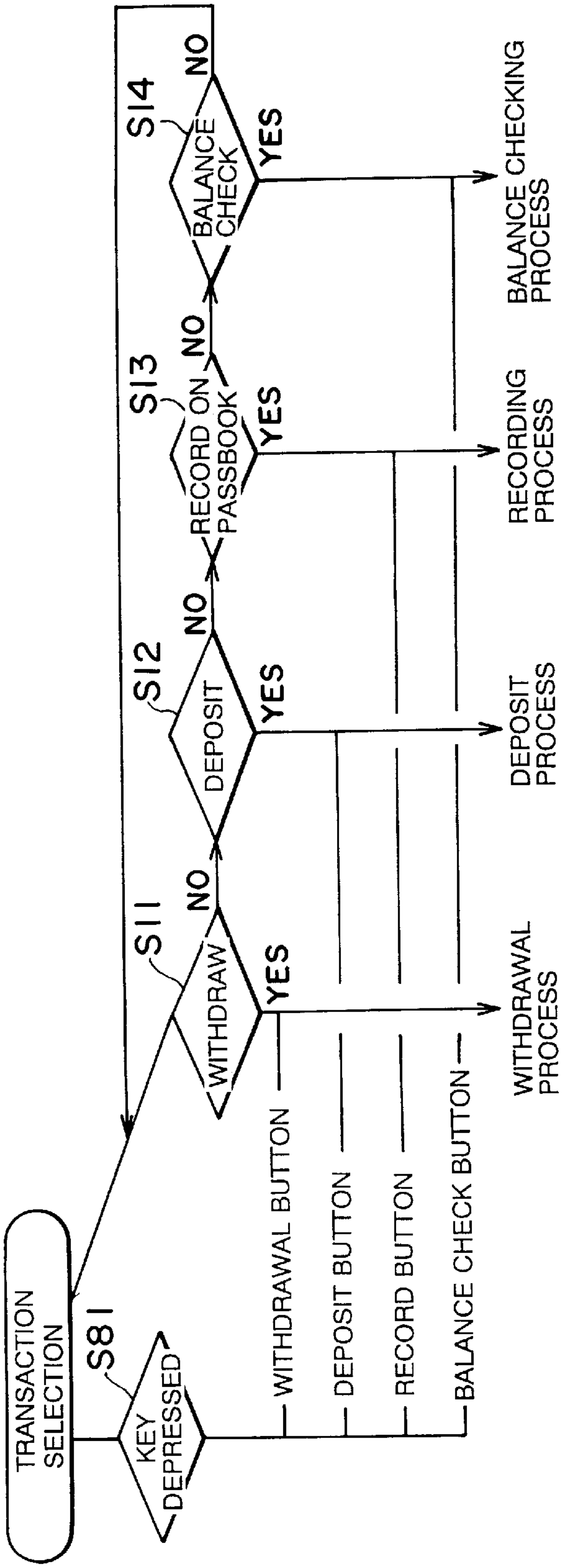
FIG. 20 is a flowchart illustrating the operations of the essential portions of the ATM in FIG. 19.

In this case, the direct operation of the item button is detected by the operation selector 9 and when this even is detected, the alternative selection is skipped and a transaction item is directly selected by the information input processor 8 (step S81), as shown in FIG. 20.

Further, at the beginning of the operation, a user may decide whether to choose the alternative style or the operation involving the direct operation of item buttons or the like as in the prior art.

This design corresponds to the automated transaction apparatus according to the fourth aspect of this invention as described earlier. This apparatus further has the information input processor 8, which uses an input style like the multiple selection style as employed in the prior art, and the operation selector 9 for selecting one of the alternative input style and the information input style other than the alternative input style. This design allows a user to select the input operation style as needed, thus ensuring an operation by the proper input operation style desired by the user or convenient for the user.

Further, the switch 10 as the input device 2 is placed over the display surface of the display device 1 to provide the transparent switch 10, so that when a user touches the display surface, information corresponding to the display content of the display device 1 associated with the touched position is input. Therefore, the user can easily grasp the relationship between the input request by the alternative input style and the input operation, and can perform the interactive operation more easily.

This structure corresponds to the automated transaction apparatus according to the fifth aspect of this invention as described earlier. This apparatus has the transparent switch 10 placed over the display surface of the display device 1, so that when a user touches the display screen, information corresponding to the display content of the display device 1 associated with the touched position is input. This can allow the user to easily grasp the relationship between the input request by the alternative input style and the input operation. The user can therefore perform the interactive operation more easily.

It is apparent that, in this invention, a wide range of different working modes can be formed based on the invention without deviating from the spirit and scope of the invention.

What is claimed is:

1. An automated transaction apparatus comprising:

a transaction processor for performing a transactional operation based on information input by a user;

a display device for displaying information regarding the transactional operation and when information is required from a user displaying a set of possible responses and identifying one possible response as a selected item of information; and an input unit for receiving one of an affirmative response and a negative response when information is required from a user and when an affirmative response is received inputting the selected item of information to said transaction processor and when a negative response is received causing said display device to identify another possible response as the selected item of information.

2. An automated transaction apparatus comprising:

a transaction processor that performs a transactional operation based on information input by a user;

a display device that displays information regarding the transactional operation and when the transaction processor requires information comprising a string of digits from the user, said display device displays an indication of the number of digits required for the string of digits and displays each of a plurality of acceptable input digits with one acceptable input digit being highlighted; and an input unit that receives one of a YES and a NO response from the user, each time a YES is received the highlighted input digit is entered into the string of digits and each time a NO is received a next input digit is highlighted until all of the digits in the string of digits are entered.

3. A program for receiving numerical user input in an automated teller machine comprising the functions:

(a) displaying an input indication showing a number of digits required as input from the user;

(b) displaying, in conjunction with the input indication the numbers 0, 1, 2, 3, 4, 5, 6, 7, 8, and 9;

(c) highlighting a first number along with providing an indication of which digit is currently being entered by the user;

(d) allowing the user to input one of a YES and a NO, when a NO is input highlighting a next number, and when a YES is input entering the currently highlighted number into the digit being entered and highlighting a next digit to be entered by the user; and (e) repeating steps (c) and (d) until all of the required number of digits have received a user indicated number.

* * * * *